United States Patent [19]
Sadiq et al.

[11] Patent Number: 6,029,177
[45] Date of Patent: Feb. 22, 2000

[54] METHOD AND SYSTEM FOR MAINTAINING THE INTEGRITY OF A DATABASE PROVIDING PERSISTENT STORAGE FOR OBJECTS

[75] Inventors: Waqar Sadiq, Rochester Hills; Fred Arthur Cummins, Farmington Hills, both of Mich.

[73] Assignee: Electronic Data Systems Corporation, Plano, Tex.

[21] Appl. No.: 09/016,143

[22] Filed: Jan. 30, 1998

Related U.S. Application Data

[60] Provisional application No. 60/065,400, Nov. 13, 1997.

[51] Int. Cl.[7] .................................................. G06F 17/30
[52] U.S. Cl. ............................ 707/201; 707/8; 707/103; 707/202; 709/101; 709/303
[58] Field of Search ................................ 707/8, 201, 202, 707/203, 103; 709/101, 201, 205, 303

[56] References Cited

U.S. PATENT DOCUMENTS

| | | | |
|---|---|---|---|
| 5,712,971 | 1/1998 | Stanfill et al. | 714/35 |
| 5,872,969 | 2/1999 | Copeland et al. | 709/101 |

FOREIGN PATENT DOCUMENTS

| | | | |
|---|---|---|---|
| 2301686 | 12/1996 | United Kingdom | G06F 17/30 |

OTHER PUBLICATIONS

"A Change Management Framework: Dependency Maintenance and Change Notification," Huh, Soon–Young et al., Journal of Systems Software, vol. 34, Issue 3, pp. 231–246, Sep. 1996.

*Primary Examiner*—Hosain T. Alam
*Attorney, Agent, or Firm*—L. Joy Griebenow; Baker & Botts L.L.P.

[57] ABSTRACT

One aspect of the invention is a method for updating a database providing persistent storage for a plurality of objects each comprising methods and instance variables, wherein a persistent record of each of the plurality of objects will experience a change in the context of a transaction if the transaction is allowed to commit. The method comprises sending a first prepare message to each of the plurality of objects, the plurality of objects sending their state to the database in response to the first prepare messages. A second prepare message is sent to the database if a prepared indicator was received in response to each of the first prepare messages. A commit message is sent to each of the plurality of objects and to the database if a prepared indicator was received in response to each of the first prepare messages and if a prepared indicator was received in response to the second prepare message.

22 Claims, 2 Drawing Sheets

METHOD AND SYSTEM FOR MAINTAINING THE INTEGRITY OF A DATABASE PROVIDING PERSISTENT STORAGE FOR OBJECTS

RELATED APPLICATIONS

This application claims the benefit of U.S. provisional application serial No. 60/065,400, which was filed on Nov. 13, 1997.

TECHNICAL FIELD OF THE INVENTION

This invention relates generally to object-oriented programming and more particularly to a method and system for maintaining the integrity of a database providing persistent storage for one or more objects.

BACKGROUND OF THE INVENTION

Some computer applications are so large and the number of users of the applications so large that it makes sense to divide up the work of the application among multiple computers and, potentially, to store the information used by the application in many different places. Such applications are commonly referred to as distributed applications. Conventional distributed applications store shared information in multiple databases that may reside on many different computers.

Recently, however, software developers have begun to create distributed object systems. Distributed object systems comprise objects shared in computer memory and one or more processes running on one or more computers. In distributed object systems, then, an additional shared resource, the distributed object, needs to be accounted for.

Persistence of data is an important attribute in a distributed system. Data is preferably stored in a nonvolatile storage medium so that the system may be both recovered in the event of a failure and restarted in the state in which the system was shut down. A single transaction in a distributed system may update a number of items of data. If only some of the data items are persistently stored while others are not, then the state of the system may not be recoverable.

To maintain persistence in conventional distributed systems, a two-phase commit protocol is generally used to synchronize the update of multiple databases. The two-phase commit protocol assumes that the database management system will perform necessary data integrity checks. This is reasonable when databases are the focus of control between multiple applications. However, in a shared, distributed object system, the shared objects become the focus of control and more sophisticated integrity checks may be desirable.

In addition, in a distributed object environment with transparent persistence, changes to objects will be made within the context of a transaction independent of the database management system. When the transaction is completed, the order in which the state of the objects is submitted to the database may not cause efficient updates of the database, particularly where the objects are mapped to a database with different schema (e.g., objects stored in a relational database). Efficient updates may require that some writes to the database include elements of multiple objects. In addition, database integrity rules may call for some objects to be created before others can include references to them. Thus, the database facility should receive all of the object updates before beginning to perform the corresponding database update.

SUMMARY OF THE INVENTION

The invention comprises a method and system for updating a database providing persistent storage for a plurality of objects. The invention is particularly useful in distributed object systems but could be used in other types of systems. One aspect of the invention is a method for updating a database providing persistent storage for a plurality of objects each comprising methods and instance variables wherein a persistent record of each of the plurality of objects will experience a change in the context of a transaction if the transaction is allowed to commit. The method comprises sending a first prepare message to each of the plurality of objects with the plurality of objects sending their state to the database in response to the prepare message. A second prepare message is sent to the database if a prepared indicator was received in response to each of the first prepare messages. A commit message is then sent to each of the plurality of objects and to the database if a prepared indicator was received in response to each of the first prepare message and if a prepared indicator was received in response to the second prepare message.

The invention has several important technical advantages. The invention provides a straightforward way to optimize the persistent storage in a database of the state of objects. The invention allows multiple writes to a database to be buffered and combined, thus allowing a single write operation where multiple write operations may have been required if the database operations were not all sent by the objects prior to any updates being performed for a particular transaction. The invention allows proper coordination of database keys so that the database may be updated in the order imposed by the database structure. In addition, the invention allows a generic interface to many different types of databases, thus allowing the separation of business object state management from persistence management. This separation furthers the goal of abstraction of a large distributed object system. Abstraction is furthered because database management is separate from object management so the development of object applications is simplified.

The invention may also include an optional validate message sent to the objects prior to the first prepare message. Such an embodiment allows an efficient way to ensure the integrity of data and shared objects and is particularly useful in distributed object systems. Validation methods can be created and tailored to the needs of each specific object. Because validation methods may be so tailored, these validation methods may include sophisticated business rules along with more general rules such as, for example, no division by zero. Because distributed objects have access to other distributed objects, validation tests can be performed involving multiple distributed objects and/or data stored in multiple databases. Thus, the validation methods are more powerful than data integrity checks performed in conventional distributed systems.

The invention simplifies and makes possible sophisticated validation methods that may not be otherwise attainable. Because an object may pass through transitory invalid states before arriving at a valid new state, validity checks are advantageously performed at the end of a transaction, rather than during the steps leading up to the end of a transaction. Of course, some validation tests may occur during the transaction itself and such tests are not precluded by the invention.

The invention also may advantageously perform validation tests on all objects changed by a transaction and receive a response to the validation before proceeding with the preparation for a commit. Thus, if multiple points of invalidity are discovered, appropriate error messages for all points of invalidity may be delivered to the process initiating the transaction, thus allowing easier identification and solution of problems. In an alternative embodiment, only those objects requiring a validation test may register with a transaction service for a validation. This feature of the invention may make the protocol more efficient.

The invention may forward object state to a database maintaining persistence for that object only if the prepare message and, if included, the validate message were successful. This feature of the invention means the database updates are not made unless an object updated by a particular transaction indicated a successful prepare and optionally, a successful validate.

BRIEF DESCRIPTION OF THE DRAWINGS

For a more complete understanding of the present invention and the advantages thereof, reference is now made to the following descriptions, taken in conjunction with the accompanying drawings, in which.

DETAILED DESCRIPTION OF THE INVENTION

Figure 1:
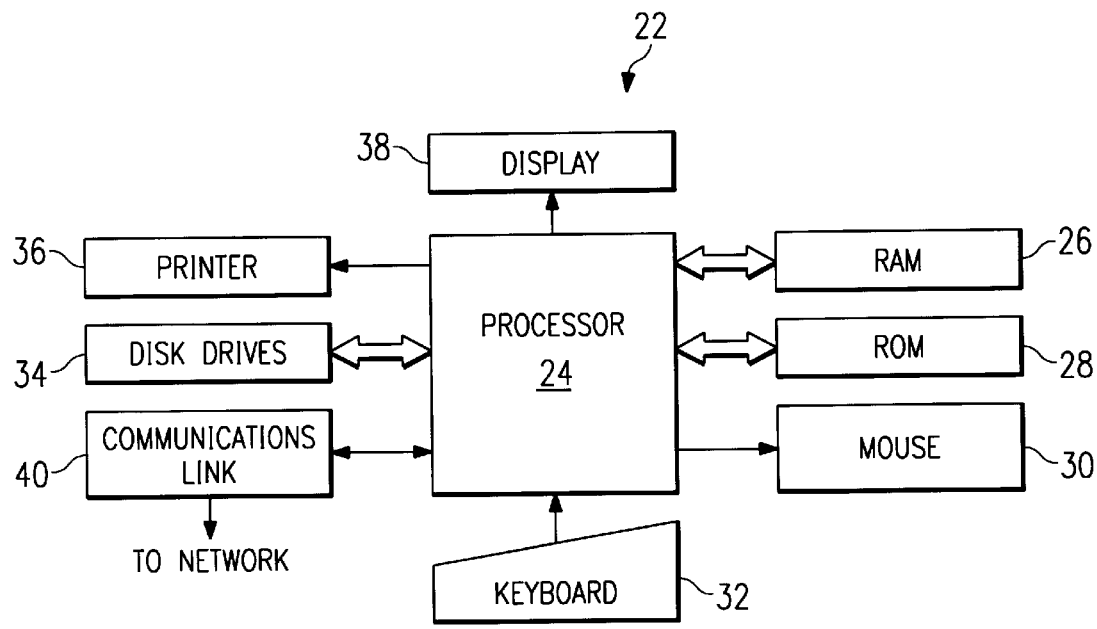
FIG. 1 illustrates an exemplary general purpose computer that may be used to implement the present invention.
Figure 2:
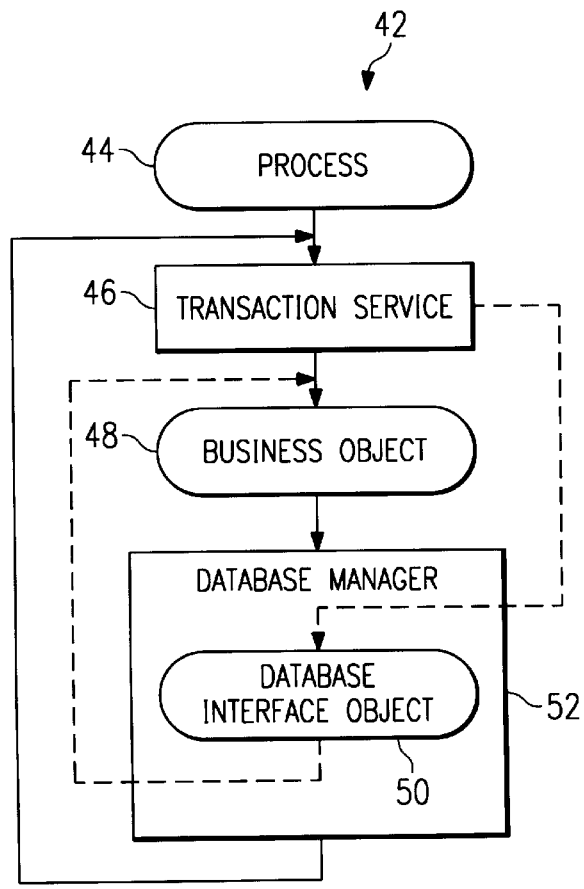
FIG. 2 illustrates an exemplary distributed object system constructed in accordance with the invention.
Figure 3:
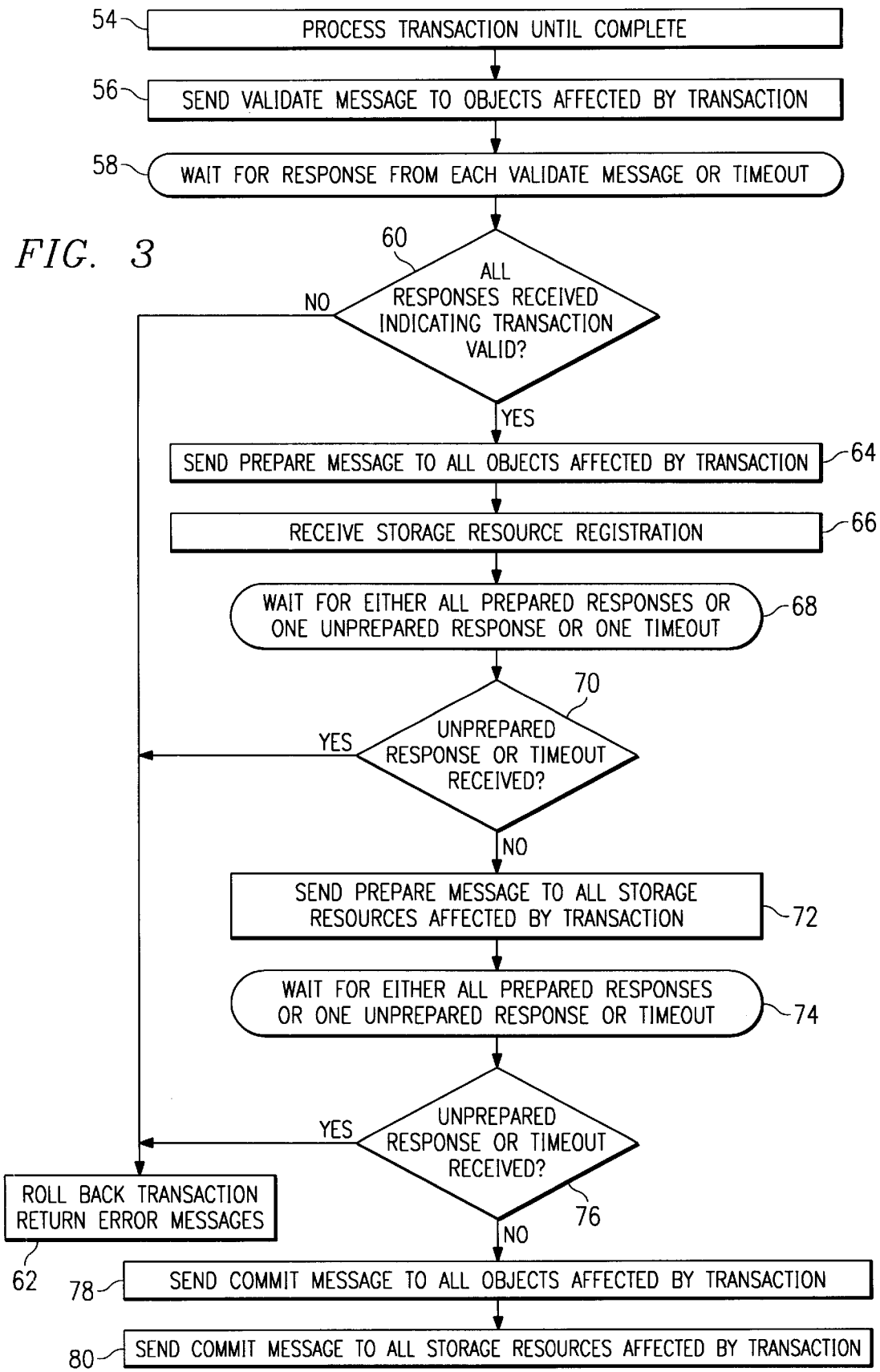
FIG. 3 illustrates a portion of the operation of an exemplary transaction service constructed in accordance with the invention.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used in a distributed object system created in accordance with the invention. The general purpose computer 22 may be used to execute distributed applications and/or distributed system services in accordance with the invention. General purpose computer 22 may also be used in object systems other than distributed object systems. General purpose computer 22 may be adapted to execute any of the well known OS2, UNIX, MAC-OS, and WINDOWS operating systems or other operating systems. General purpose computer 22 comprises processor 24, random access memory (RAM) 26, read-only memory (ROM) 28, mouse 30, keyboard 32, and input/output devices such as disk drives 34, printer 36, display 38, and communications link 40. The present invention includes programs that may be stored in RAM 26, ROM 28, or disk drives 34 and may be executed by processor 24. Communications link 40 connects to a computer network but could be connected to a telephone line, an antenna, a gateway or any other type of communications link. Disk drives 34 may include a variety of types of storage media, such as, for example, floppy disk drives, hard disk drives, CD ROM drives or magnetic tape drives. Although this embodiment employs a plurality of disk drives 34, a single disk drive 34 could be used without departing from the scope of the invention. FIG. 1 only provides one example of a computer that may be used with the invention. The invention could be used in computers other than general purpose computers, as well as on general purpose computers without conventional operating systems.

FIG. 2 illustrates an exemplary distributed object system constructed in accordance with the invention. Although the invention may be used in any system employing shared objects, it is particularly useful in distributed object systems. Distributed object system 42 comprises a plurality of computers 22 (not explicitly shown) networked together. Any number of computers could be included without departing from the scope of the invention. Data for distributed objects may, for example, be maintained in one or more databases contained in storage media controlled by one or more of the computers 22.

A process accessing a distributed object does so using a transaction service. In this embodiment, process 44 uses transaction service 46 to access a distributed object— business object 48. Transaction service 46 may perform many functions in addition to the integrity maintenance functions of the invention. Also, transaction service 46 may be a part of process 44. The term transaction service 46 is meant to refer broadly to computer software that performs the staged prepare-commit protocol of the invention.

The exemplary system illustrated in FIG. 2 will be used to illustrate the operation of transaction service 46 in maintaining the integrity of business object 48 and one or more databases providing persistent storage for business object 48. Multiple transaction services 46 could be used to control access to distributed objects such as business object 48 without departing from the scope of the invention. In addition, multiple processes, such as process 44 will commonly access distributed objects such as business object 48. In one embodiment, transaction service 46 generates three objects for each transaction: a controller object, a terminator object, and a coordinator object. Transaction service 46 may use the terminator object to perform the method of the invention.

In this embodiment, a database manager 52 is used to control the interface between processes such as process 44 and business objects such as business object 48 in one or more databases providing persistent storage for business object 48. Multiple objects could be combined for storage together as a record in a database or multiple databases (or records) could be used to store portions of a distributed object without departing from the scope of the invention.

In this embodiment, database manager 52 provides a database interface object 50 to handle the interface between transaction service 46 and/or business object 48 and a database providing persistent storage for business object 48. Any type of architecture could be used to handle the interface between transaction service 46 and/or business object 48 and a database providing persistent storage for business object 48 without departing from the scope of the invention. Although the operation of an embodiment of the invention will be described more completely in connection with FIG. 3 below, a brief overview of the operation of the invention may be provided with reference to FIG. 2. When process 44 has finished its operations and wishes to commit a transaction, it notifies transaction service 46 that the transaction has been completed. In a distributed object system, the term transaction generally refers to an object transaction comprising a unit of work such that all of the work is either made permanent as a group or rolled back together. Accordingly, a transaction may include one or more updates to one or more business objects and one or more updates to one or more databases.

When transaction service 46 receives notification that a transaction has been completed, it uses the terminator object for the transaction to send a validate message to all shared objects such as business object 48 that has been changed by the transaction. After receiving a positive response to each of these validate messages, transaction service 46 then sends a prepare message to each of the shared objects that were changed by the transaction. In response to the prepare message, each object changed by the transaction, such as business object 48, sends its changed state to a database for purposes of persistence. In this embodiment, if the transaction has not previously established a connection with each database providing persistent storage for the shared objects involved in the transaction, then the shared objects, such as business object 48, would first request a connection to the appropriate database using database manager 52. Database manager 52 may provide business object 48 with a connection to a database using a database interface object 50. Database manager 52 will register database interface object 50, and therefore, the underlying database, with transaction service 46 as a storage resource involved in the transaction. Thus, transaction service 46 will maintain a list of those shared objects changed by a transaction and those storage resources providing persistent storage for such objects.

After transaction service 46 has received a positive response to all prepare messages sent to all of the objects changed by a transaction, then a prepare message is sent to each database by transaction service 46. In this embodiment, the message is sent using database interface object 50. In response to the prepare message, each database performs the required updates to the database and sends a message back to the transaction service indicating that the database is prepared. If any of the databases are unprepared, then transaction service 46 may direct each database to undo the changes that were made in response to the prepare messages.

After transaction service 46 receives a prepared indicator from each of the storage resources in response to the second set of prepare messages, it then sends a commit to each of the shared objects and databases affected by the transaction to make the changes permanent. In one embodiment, the commit message is first sent to all objects and after a successful return is received, then a commit is sent to all databases. In another embodiment, the commit message may be sent to shared objects and databases in any order or simultaneously.

Thus, the invention employs a staged prepare with a first prepare message sent to all shared objects affected by a transaction and a second prepare message sent to all storage resources affected by a transaction. The staged prepare allows all database updates for a particular transaction to be collected before any updates to the database are made. Such collection allows optimization of multiple operations and proper coordination of database keys so that updates are made in the proper order. The commit process may or may not be staged as discussed.

FIG. 3 illustrates a flowchart describing a portion of the operation of transaction service 46 in accordance with the invention. In step 54, the transaction is processed until it is complete. Then, in step 56, transaction service 46 sends a validate message to all shared objects such as business object 48 affected by the transaction. In an alternative embodiment, in step 56, transaction service 46 would send a validate message only to those objects that had registered for validation with transaction service 46. In such an alternative embodiment, each distributed object requiring validation could be made operable to register for validation with transaction service 46. Alternatively, transaction service 46 could poll distributed objects involved in the transaction to determine whether those objects will require validation at the conclusion of the transaction.

In response to the validation messages received from transaction service 46, the distributed objects each perform validation methods to determine whether the changes caused by the transaction are valid or not. In performing the validation function, distributed objects may access other distributed objects and/or databases to make the validation determination. Changes preferably should not be made to the data of a distributed object during the validation process because such a change may cause another change that affects the integrity of the system. For example, changing a price of an item on an invoice could affect the total price for the goods reflected on the invoice, which could violate an already evaluated business rule for the maximum total price.

Transaction service 46 keeps track of all operations and all objects in databases that have been affected by a particular transaction. Thus, transaction service 46 knows which objects require validation at the end of the transaction. Validation is preferably done before database updates because all potential problems should be identified before databases are updated. Undoing updates to databases may result in costly consumption of computing resources.

In step 58, transaction service 46 waits for either a response or a timeout for each validate message that was sent. In an alternative embodiment, transaction service 46 could proceed after receiving a single invalid response from any one of the objects to which a validate message was sent. By waiting to receive the response to all validate messages, however, transaction service 46 may identify all potential problems with a given transaction, thus facilitating easier identification and solution of problems with a transaction.

Next, in step 60, it is determined whether all responses received indicated that the transaction was valid. If not, then the transaction is rolled back in step 62 and error messages are returned. Conventional methods for transaction rollback may be used. If a valid response was received to each validate message sent by transaction service 46, then in step 64 a prepare message is sent to all objects affected by the transaction. Then, in step 66, transaction service 46 receives storage resource registration from any database or other storage resource that will be affected by the transaction. As discussed before, the sending of the prepare message to all objects affected by the transaction causes those distributed objects to request a database connection to that database that provides persistent storage for the distributed object. Database manager 52 will cause the database manager for that database to be registered as a storage resource with transaction service 46.

Then, in step 68, transaction service 46 waits to receive either a prepared response to each of the prepare messages or one unprepared response or one timeout in response to the prepare messages. If even one unprepared response or timeout is received, then transaction service 46 need not wait to receive a response to any additional prepare messages. In step 70, it is determined whether an unprepared response or timeout was received. If so, then transaction service 46 proceeds to step 62 and rolls back the transaction. If not, and prepared responses are received to all of the prepare messages, then in step 72, transaction service 46 sends a prepare message to all storage resources affected by the transaction.

The sending of the prepare message to the storage resources in step 72 causes those storage resources to update their state to reflect the changes made by the transaction. After those changes have been made successfully, the storage resources send back a prepared response indicating that they are prepared to complete the transaction. Again, transaction service 46 waits to receive either a prepared response to each of the prepare messages or one unprepared response or one timeout in response to the prepare messages. If even one unprepared response or timeout is received, then transaction service 46 need not wait to receive a response to any additional prepared messages.

In step 76, it is determined whether an unprepared response or a timeout was received. If so, then transaction service 46 proceeds to step 62 and rolls back the transaction. If not, and prepared responses have been received to all of the prepare messages, then in step 78, transaction service 46 sends a commit message to all objects affected by the transaction so that the changes may be made permanent. Then, in step 80, a commit message is sent to all storage resources affected by the transaction to make those changes permanent. In an alternative embodiment, steps 78 and 80 may be combined and the commit messages may be sent to objects affected by the transaction and storage resources affected by the transaction in any order.

In another embodiment of the invention (not explicitly shown), the business objects can be designed to handle system assigned keys. In some relational database systems, a system assigned key is generated as the primary key in a table. For example, in a purchase order system, a system assigned key might be generated for each order and serve as the order number. These keys, however, are usually generated when the table row is first written out to the database. Where other database tables use the system assigned key as a foreign key, those tables may not be written until the system assigned key is available. With the present invention, a problem is then created when a transaction is going to commit where the transaction generated one or more new objects. If an object is related to another object with an object identifier comprising a system assigned key, saving that object may not be possible without knowing the system assigned key.

Thus, in the alternative embodiment of the invention, database preliminary updates for new objects may be made as soon as an object's state is received from the object in response to a prepare message. To handle system assigned keys, an object that is related to an object with a system assigned key and uses the system assigned key as a foreign key in the database providing persistent storage may send the prepare message to the related object, rather than waiting for the transaction service to do so. After the related object receives the prepare message, it will send its state to the database for storage. The database may then store the related object's state immediately and receive the system assigned key and return it to the object which generated the prepare message. When the transaction service generates a prepare for the related object, it may simply indicate that it is prepared without sending its state to the database. Alternatively, the transaction service could be notified that it need not send a prepare message to the related object.

Although the present invention has been described in detail, it should be understood that various changes, substitutions, and alterations can be made hereto without departing from the spirit and scope of the invention as defined by the appended claims.

What is claimed is:

1. A method for updating a database providing persistent storage for a plurality of objects each comprising methods and instance variables, wherein a persistent record of each of the plurality of objects will experience a change in the context of a transaction if the transaction is allowed to commit, the method comprising:

sending a first prepare message to each of the plurality of objects, the plurality of objects sending their state to the database in response to the first prepare messages;

sending a second prepare message to the database if a prepared indicator was received in response to each of the first prepare messages;

sending a commit message to each of the plurality of objects and to the database if a prepared indicator was received in response to each of the first prepare messages and if a prepared indicator was received in response to the second prepare message.

2. The method of claim 1, wherein the commit message is sent first to each of the plurality of objects and then to the database.

3. The method of claim 1, wherein sending a first prepare message further comprises:

sending a first prepare message to each of the plurality of objects;

establishing a connection with the database, the connection associated with the transaction;

registering the database connection with a transaction service, the registration being used by the transaction service to determine whether to send the second prepare message to the database; and sending the state of each of the plurality of objects to the database.

4. The method of claim 1, wherein the second prepare message causes the database to be updated to reflect the state of the plurality of objects as changed by the transaction.

5. The method of claim 3, wherein the commit message is sent first to each of the plurality of objects and then to the database.

6. The method of claim 1, further comprising:

sending a validate message to ones of the plurality of objects; and wherein the first prepare messages are sent if a valid indicator was received in response to each validate message.

7. The method of claim 6, wherein the commit message is sent first to each of the plurality of objects and then to the database.

8. The method of claim 6, wherein sending a first prepare message further comprises:

sending a first prepare message to each of the plurality of objects;

establishing a connection with the database, the connection associated with the transaction;

registering the database connection with a transaction service, the registration being used by the transaction service to determine whether to send the second prepare message to the database; and sending the state of each of the plurality of objects to the database.

9. The method of claim 6, wherein the second prepare message causes the database to be updated to reflect the state of the plurality of objects as changed by the transaction.

10. The method of claim 6, wherein ones of the plurality of objects are operable to register for validation with the transaction service and wherein a validate message is sent to only those objects that register for validation with the transaction service.

11. The method of claim 1, further comprising:

rolling back the transaction if any of the plurality of objects fails to return a prepared indicator in response to the first prepare message; and rolling back the transaction if the database fails to return a prepared indicator in response to the second prepare message.

12. A system for maintaining persistence in a distributed object environment comprising a plurality of objects each comprising methods and instance variables, wherein a persistent record of a first number of the plurality of objects will experience a change in the context of a transaction if the transaction is allowed to commit, the system comprising:

a transaction service running on at least one computer and operable to send a first prepare message to each of the plurality of objects, at least one of the plurality of objects sending its state to a first database in response to the prepare message;

send a second prepare message to at least the first database if a prepared indicator was received in response to each of the first prepare messages;

send a commit message to each of the plurality of objects and to the first database if a prepared indicator was received in response to each of the first prepare messages and if a prepared indicator was received in response to each of the second prepare messages.

13. The system of claim 12, wherein the commit message is sent first to each of the plurality of objects and then to the first database.

14. The system of claim 12, wherein the transaction service is further operable to receive a registration request from the first database;

registering the first database in response to the registration request; and send a second prepare message to each database associated with the transaction from which a registration request was received if a prepared indicator was received in response to each of the first prepare messages.

15. The system of claim 12, wherein the second prepare message causes the first database to be updated to reflect the state of the first object as changed by the transaction.

16. The system of claim 12, wherein the transaction service is further operable to:

send a validate message to ones of the plurality of objects; and wherein the first prepare messages are sent if a valid indicator was received in response to each validate message.

17. The system of claim 12, wherein ones of the plurality of objects are operable to register for validation with the transaction service and wherein a validate message is sent to only those objects that register for validation with the transaction service.

18. The system of claim 12, wherein the transaction service is further operable to:

roll back the transaction if any of the plurality of objects fails to return a prepared indicator in response to the first prepare message; and roll back the transaction if the first database fails to return a prepared indicator in response to the second prepare message.

19. The system of claim 12, wherein at least one of the plurality of objects sends its state to a second database in response to the prepare message;

wherein the transaction service is further operable to send a second prepare message to the second database if a prepared indicator was received in response to each of the first prepare messages.

20. The system of claim 16, wherein the commit message is sent first to each of the plurality of objects and then to the first database; and wherein the transaction service is further operable to receive a registration request from the first database;

registering the first database in response to the registration request; and send a second prepare message to each database associated with the transaction from which a registration request was received if a prepared indicator was received in response to each of the first prepare messages.

21. The system of claim 12, wherein a first one of the plurality objects is related to a second one of the plurality of objects, wherein the second object's persistent record comprises a system assigned key, and wherein the first object is operable to generate the first prepare message to the second object where the system assigned key for the second object has not been previously generated.

22. The system of claim 21, wherein the database is updated to reflect the state of the second object and retrieve the system assigned key in response to the first prepare message to the second object.

* * * * *